United States Patent
Daniell

(10) Patent No.: US 7,610,341 B2
(45) Date of Patent: Oct. 27, 2009

(54) FILTERED EMAIL DIFFERENTIATION

(75) Inventor: W. Todd Daniell, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 789 days.

(21) Appl. No.: 10/686,346

(22) Filed: Oct. 14, 2003

(65) Prior Publication Data

US 2005/0097174 A1    May 5, 2005

(51) Int. Cl.
   G06F 15/16    (2006.01)
   G06F 15/173    (2006.01)
(52) U.S. Cl. ...................... 709/206; 709/224
(58) Field of Classification Search ............ 709/206, 709/207, 246, 224; 715/523, 526
See application file for complete search history.

(56) References Cited

U.S. PATENT DOCUMENTS

| | | | |
|---|---|---|---|
| 5,944,787 A | | 8/1999 | Zoken |
| 5,999,932 A | * | 12/1999 | Paul ............................ 707/10 |
| 6,023,723 A | * | 2/2000 | McCormick et al. ........ 709/206 |
| 6,052,709 A | | 4/2000 | Paul |
| 6,161,130 A | * | 12/2000 | Horvitz et al. .............. 709/206 |
| 6,192,360 B1 | | 2/2001 | Dumais et al. |
| 6,249,805 B1 | | 6/2001 | Fleming |
| 6,266,692 B1 | | 7/2001 | Greenstein |
| 6,321,267 B1 | | 11/2001 | Donaldson |
| 6,442,588 B1 | | 8/2002 | Clark et al. |
| 6,480,885 B1 | | 11/2002 | Olivier |
| 6,654,787 B1 | * | 11/2003 | Aronson et al. ............. 709/206 |
| 6,654,800 B1 | | 11/2003 | Rieger |
| 6,708,205 B2 | | 3/2004 | Sheldon et al. |
| 6,732,157 B1 | | 5/2004 | Gordon et al. |
| 6,748,403 B1 | | 6/2004 | Lemke |
| 6,757,740 B1 | | 6/2004 | Parekh et al. |
| 6,763,462 B1 | | 7/2004 | Marsh |
| 6,769,016 B2 | * | 7/2004 | Rothwell et al. ............ 709/206 |
| 6,779,021 B1 | * | 8/2004 | Bates et al. ................. 709/206 |
| 6,782,510 B1 | | 8/2004 | Gross et al. |
| 6,842,773 B1 | | 1/2005 | Ralston et al. |
| 6,847,931 B2 | | 1/2005 | Addison et al. |
| 6,854,014 B1 | | 2/2005 | Amin et al. |
| 6,925,454 B2 | | 8/2005 | Lam et al. |
| 6,941,466 B2 | | 9/2005 | Mastrianni |
| 6,968,571 B2 | | 11/2005 | Devine et al. |
| 7,007,080 B2 | | 2/2006 | Wilson |
| 7,051,077 B2 | * | 5/2006 | Lin ............................ 709/207 |

(Continued)

OTHER PUBLICATIONS

Cecil Williams, "Effective Spam Filtering with Eudora—The Filters", Aug. 6, 2003, Web page retreived from The Internet Archive Wayback Machine, available at: http://web.archive.org/web/20030806181316/http://www.cecilw.com/eudora/filters.htm.*

(Continued)

*Primary Examiner*—Aaron Strange
(74) *Attorney, Agent, or Firm*—Thomas, Kayden, Horstemeyer & Risley, LLP

(57) ABSTRACT

The present disclosure provides systems and methods for removing an undesired email message. Some embodiments comprise providing detection mechanisms for detecting undesired email messages from an email service of a user. Accordingly, a user interface may be provided to display an identification of an undesired email message in a particular visual manner that is associated with a particular detection mechanism. Other systems and methods are also provided.

23 Claims, 13 Drawing Sheets

U.S. PATENT DOCUMENTS

| | | | |
|---|---|---|---|
| 7,117,358 | B2 | 10/2006 | Bandini et al. |
| 7,155,484 | B2 | 12/2006 | Malik |
| 7,155,608 | B1 | 12/2006 | Malik |
| 7,159,149 | B2 | 1/2007 | Spiegel et al. |
| 7,165,239 | B2 | 1/2007 | Hejlsberg et al. |
| 7,188,173 | B2 | 3/2007 | Anderson et al. |
| 7,249,162 | B2 | 7/2007 | Rounthwaite et al. |
| 7,272,853 | B2 | 9/2007 | Goodman et al. |
| 7,451,184 | B2 | 11/2008 | Malik |
| 7,506,031 | B2 | 3/2009 | Malik |
| 2001/0054101 | A1 | 12/2001 | Wilson |
| 2002/0013692 | A1 | 1/2002 | Chandhok et al. |
| 2002/0049806 | A1 | 4/2002 | Gatz et al. |
| 2002/0059454 | A1 | 5/2002 | Barrett et al. |
| 2002/0065828 | A1 | 5/2002 | Goodspeed |
| 2002/0073233 | A1 | 6/2002 | Gross et al. |
| 2002/0107712 | A1 | 8/2002 | Lam |
| 2002/0116641 | A1 | 8/2002 | Mastrianni |
| 2002/0199095 | A1 | 12/2002 | Bandini |
| 2003/0097409 | A1 | 5/2003 | Tsai |
| 2003/0097410 | A1 | 5/2003 | Atkins et al. |
| 2003/0144842 | A1 | 7/2003 | Addison |
| 2003/0172020 | A1 | 9/2003 | Davies et al. |
| 2003/0172196 | A1 | 9/2003 | Hejlsberg |
| 2003/0233418 | A1 | 12/2003 | Goldman |
| 2004/0015554 | A1 | 1/2004 | Wilson |
| 2004/0039786 | A1 | 2/2004 | Horvitz et al. |
| 2004/0054733 | A1 | 3/2004 | Weeks |
| 2004/0054741 | A1 | 3/2004 | Weatherby et al. |
| 2004/0064537 | A1 | 4/2004 | Anderson |
| 2004/0073617 | A1 | 4/2004 | Miliken et al. |
| 2004/0088359 | A1* | 5/2004 | Simpson ............ 709/206 |
| 2004/0093384 | A1 | 5/2004 | Shipp |
| 2004/0107189 | A1 | 6/2004 | Burdick |
| 2004/0117451 | A1 | 6/2004 | Chung |
| 2004/0123153 | A1 | 6/2004 | Wright et al. |
| 2004/0167964 | A1 | 8/2004 | Rounthwaite |
| 2004/0181581 | A1 | 9/2004 | Kosco |
| 2004/0193606 | A1 | 9/2004 | Arai et al. |
| 2005/0022008 | A1 | 1/2005 | Goodman |
| 2005/0050150 | A1 | 3/2005 | Dinkin |
| 2008/0256210 | A1 | 10/2008 | Malik |

OTHER PUBLICATIONS

SpamXpress, "spamXpress—anti-spam Rules/Filters for Outlook Express", Jun. 2, 2003, Web page retreived from The Internet Archive Wayback Machine, available at: http://web.archive.org/web/20030602073212/http://www.spamxpress.com/.*

Houten-Kemp; "E-Mail Glossary", Everything E-mail, Internet Mail Services Netowrk, Inc., Ipswich, MA; copyright 1997-1999; 3 pages.

Oracle; "How Does eMail Server Work?", Oracle eMail Server Understanding and Planning Guide, Release 5.1, copyright 2000; 13 pages.

IATS Computing Knowledge Base; "How does Email Work?", University of Missouri, Columbia; Aug. 16, 2000; 4 pages.

Coleman; "How Does Email Work?", Yale University Library Workstation Support Group; Mar. 18, 1997; 4 pages.

Brain; "The Simplicity of E-mail", How E-mail Works, Marshall Brian's How Stuff Works; copyright 1998-2001; 1 page.

Brain; "Understanding a Simple E-mail Server?", How E-mail Works, Marshall Brian's How Stuff Works; copyright 1998-2001; 2 pages.

Brain; "Understanding Attachments?", How E-mail Works, Marshall Brian's How Stuff Works; copyright 1998-2001; 2 pages.

Brain; "Understanding E-mail Clients?", How E-Mail Works, Marshall Brian's How Stuff Works; copyright 1998-2001; 2 pages.

Brain; "Understanding SMTP?",How E-mail Works, Marshall Brian's How Stuff Works; copyright 1998-2001; 1 page.

Brain; "Understanding the POP3 Server?", How E-mail Works, Marshall Brian's How Stuff Works; copyright 1998-2001; 2 pages.

Brain; "Understanding the Real E-mail System?", How E-mail Works, Marshall Brian's How Stuff Works; copyright 1998-2001; 3 pages.

Brain; "What is an E-mail Message?", How E-Mail Works, Marshall Brian's How Stuff Works; copyright 1998-2001; 2 pages.

Graham; "A Plan for Spam"; www.paulgraham.com/spam.html; printed Jun. 26, 2003; pp. 1-13.

Graham; "Better Bayesian Filtering"; www.paulgraham.com/better.html; printed Jun. 26, 2003; pp. 1-13.

Rivest; "The MD5 Message-Digest Algorithm", Internet RFC 1321; Apr. 1992; 21 pages.

Uuencode and MIME FAQ; http://web.archive.org/web/20021217052047/http://userrs.rcn.com/wussery/attach.html. pp. 1 and 2; printed Oct. 19, 2007.

Malik; U.S. Appl. No. 10/005,641, filed Dec. 5, 2001.

Malik; U.S. Appl. No. 10/610,736, filed Jun. 30, 2003.

Malik; U.S. Appl. No. 10/687,439, filed Oct. 14, 2003.

Malik; U.S. Appl. No. 10/685,558, filed Oct. 14, 2003.

Daniell; U.S. Appl. No. 10/685,656, filed Oct. 14, 2003.

Daniell; U.S. Appl. No. 10/686,293, filed Oct. 14, 2003.

Daniell; U.S. Appl. No. 11/245,888, filed Oct. 7, 2005.

Malik; U.S. Appl. No. 11/466,948, filed Aug. 24, 2006.

Malik; U.S. Appl. No. 11/609,164, filed Dec. 11, 2006.

Malik; Non-Final Rejection mailed May 16, 2005 for U.S. Appl. No. 10/005,641, filed Dec. 5, 2001.

Malik; Final Rejection mailed Nov. 15, 2005 for U.S. Appl. No. 10/005,641, filed Dec. 5, 2001.

Malik; Non-Final Rejection mailed May 5, 2006 for U.S. Appl. No. 10/005,641, filed Dec. 5, 2001.

Malik; Notice of Allowance and Fees Due mailed Oct. 17, 2006 for U.S. Appl. No. 10/005,641, filed Dec. 5, 2001.

Malik; Non-Final Rejection mailed Nov. 12, 2004 for U.S. Appl. No. 10/610,736, filed Jun. 30, 2003.

Malik; Examiner Interview Summary Record mailed Dec. 21, 2004 for U.S. Appl. No. 10/610,736, filed Jun. 30, 2003.

Malik; Final Rejection mailed May 25, 2005 for U.S. Appl. No. 10/610,736, filed Jun. 30, 2003.

Malik; Non-Final Rejection mailed Nov. 25, 2005 for U.S. Appl. No. 10/610,736, filed Jun. 30, 2003.

Malik; Non-Final Rejection mailed Nov. 30, 2005 for U.S. Appl. No. 10/610,736, filed Jun. 30, 2003.

Malik; Final Rejection mailed Apr. 11, 2006 for U.S. Appl. No. 10/610,736, filed Jun. 30, 2003.

Malik; Examiner Interview Summary Record mailed Jun. 1, 2006 for U.S. Appl. No. 10/610,736, filed Jun. 30, 2003.

Malik; Examiner Interview Summary Record mailed Jul. 6, 2006 for U.S. Appl. No. 10/610,736, filed Jun. 30, 2003.

Malik; Notice of Allowance and Fees Due mailed Jul. 6, 2006 for U.S. Appl. No. 10/610,736, filed Jun. 30, 2003.

Malik; Non-Final Rejection mailed May 18, 2007 for U.S. Appl. No. 10/687,439, filed Oct. 14, 2003.

Malik; Final Rejection mailed Oct. 4, 2007 for U.S. Appl. No. 10/687,439, filed Oct. 14, 2003.

Malik; Advisory Action mailed Dec. 19, 2007 for U.S. Appl. No. 10/687,439, filed Oct. 14, 2003.

Malik; Non-Final Rejection mailed Mar. 17, 2008 for U.S. Appl. No. 10/687,439, filed Oct. 14, 2003.

Daniell; Non-Final Rejection mailed Jan. 2, 2008 for U.S. Appl. No. 10/685,558, filed Oct. 14, 2003.

Daniell; Non-Final Rejection mailed Oct. 30, 2007 for U.S. Appl. No. 10/685,656, filed Oct. 14, 2003.

Daniell; Examiner Interview Summary Record mailed Dec. 21, 2007 for U.S. Appl. No. 10/685,656, filed Oct. 14, 2003.

Daniell; Final Rejection mailed Mar. 31, 2008 for U.S. Appl. No. 10/685,656, filed Oct. 14, 2003.

Daniell; Non-Final Rejection mailed Feb. 5, 2007 for U.S. Appl. No. 10/686,293, filed Oct. 14, 2003.

Daniell; Examiner Interview Summary Record mailed Mar. 30, 2007 for U.S. Appl. No. 10/686,293, filed Oct. 14, 2003.

Daniell; Final Rejection mailed Jul. 23, 2007 for U.S. Appl. No. 10/686,293, filed Oct. 14, 2003.

Daniell; Non-Final Rejection mailed Dec. 5, 2007 for U.S. Appl. No. 10/686,293, filed Oct. 14, 2003.

Daniell; Examiner Interview Summary Record mailed Apr. 7, 2008 for U.S. Appl. No. 10/686,293, filed Oct. 14, 2003.
Daniell; Final Rejection mailed May 22, 2008 for U.S. Appl. No. 10/686,293, filed Oct. 14, 2003.
Malik; Non-Final Rejection mailed Mar. 9, 2007 for U.S. Appl. No. 11/466,948, filed Aug. 24, 2006.
Malik; Final Rejection mailed Sep. 26, 2007 for U.S. Appl. No. 11/466,948, filed Aug. 24, 2006.
Malik; Notice of Allowance and Fees Due mailed Mar. 27, 2008 for U.S. Appl. No. 11/466,948, filed Aug. 24, 2006.
Sahami; "A Bayesian Approach to Filtering Junk E-Mail," AAAI Workshop on Learning for Text Categorization, Jul. 1998, Madison, Wisconsin. AAAI Technical Report WS-98-05.
Mueller; "What is Spam?" available at http://spam.abuse.net/overview/whatisspam.html; Nov. 10, 2000.
Levine; "Why is Spam Bad?" available at http://www.spam.abuse.net/spambad.html; Dec. 6, 2000.
Levine; "Spammers Do More than Spam" available at http://spam.abuse.net; Nov. 10, 2000.
Woitaszek; Identifying Junk Electronic Mail in Microsoft Outlook with a Support Vector Machine. Proccedings of the 2003 Symposium on Applications of the Internet, held Jan. 27-31, 2003; 4 pages.
Daniell; Non-Final Rejection mailed Aug. 21, 2008 for U.S. Appl. No. 10/685,656, filed Oct. 14, 2003.
Malik; Notice of Allowance and Fees Due mailed Sep. 5, 2008 for U.S. Appl. No. 10/687,439, filed Oct. 14, 2003.
Daniell; Final Rejection mailed Jul. 21, 2008 for U.S. Appl. No. 10/686,558, filed Oct. 14, 2003.
Malik; Notice of Allowance and Fees Due mailed Nov. 4, 2008 for U.S. Appl. No. 11/466,948, filed Aug. 24, 2006.
Daniell; Non-Final Rejection mailed Oct. 15, 2008 for U.S. Appl. No. 10/686,293, filed Oct. 14, 2003.
Daniell, Final Rejection mailed Feb. 3, 2009 for U.S. Appl. No. 10/364,693, filed Feb. 10, 2003.
Daniell, Final Rejection mailed Feb. 4, 2009 for U.S. Appl. No. 10/685,656, filed Oct. 14, 2003.
Daniell; Interview Summary mailed Apr. 1, 2009 for U.S. Appl. No. 10/685,656, filed Oct. 14, 2003.
Daniell; Final Office Action mailed Apr. 17, 2009 for U.S. Appl. No. 10/686,293, filed Oct. 14, 2003.
Daniell; Notice of Allowance mailed Feb. 9, 2009 for U.S. Appl. No. 10/685,558, filed Oct. 14, 2003.
Malik; Non-Final Rejection mailed Mar. 31, 2009 for U.S. Appl. No. 11/609,164, filed Dec. 11, 2006.
Sheppard, Non-Final Rejection mailed Feb. 4, 2009 for U.S. Appl. No. 11/245,888, filed Oct. 7, 2005.
Sheppard; Interview Summary mailed May 5, 2009 for U.S. Appl. No. 11/245,888, filed Oct. 7, 2005.
Daniell; Non-Final Rejection mailed Jun. 12, 2009 for U.S. Appl. No. 10/685,656 filed Oct. 14, 2003 (**Copy not provided as PTO generated).
Daniell; Final Office Action mailed Aug. 12, 2009 for U.S. Appl. No. 10/686,293 filed Oct. 14, 2003 (**Copy not provided as PTO generated).
Malik; Interview Summary mailed Jun. 9, 2009 for U.S. Appl. No. 11/609,164 filed Dec. 11, 2006 (**Copy not provided as PTO generated).
Sheppard; Non-Final Rejection mailed Aug. 21, 2009 for U.S. Appl. No. 11/245,888 filed Oct. 7, 2005 (**Copy not provided as PTO generated).

* cited by examiner

FILTERED EMAIL DIFFERENTIATION

CROSS-REFERENCE TO RELATED APPLICATION

This application is related to copending U.S. utility patent application entitled "Consolidated Email Filtering User Interface" filed on the same day as the present application and accorded Ser. No. 10/686,293, which is entirely incorporated herein by reference.

TECHNICAL FIELD

The present disclosure relates generally to digital communication and, more particularly, to email.

BACKGROUND

With the advent of the Internet, email has become prevalent in digital communications. For example, email messages are exchanged on a daily basis to conduct business, to maintain personal contacts, to send and receive files, etc. Unfortunately, undesired email messages have also become prevalent with increased email traffic. Often, these email messages are unsolicited advertisements, which are often referred to as "junk mail" or "spam." Currently, software applications exist, which remove some of the spam or junk mail from a recipient's email account (or mailbox), thereby reducing clutter in the recipient's email account. Email messages that are determined to be spam or junk mail are either removed (e.g., permanently deleted) or stored in a designated folder (e.g., "trash" folder, "junk mail" folder, "spam" folder, etc.). Such applications, however, still may not be adequate to effectively remove undesired email messages.

Thus, a heretofore unaddressed need exists in the industry to address the aforementioned deficiencies and inadequacies.

SUMMARY

The present disclosure provides for removing undesired email messages. In this regard, some embodiments, among others, comprise providing a plurality of detection mechanisms for detecting undesired email messages. Accordingly, a user interface is provided to display an identification of an undesired email message in a particular visual manner that is associated with a particular detection mechanism.

Systems, methods, features, and advantages will be or become apparent to one with skill in the art upon examination of the following drawings and detailed description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
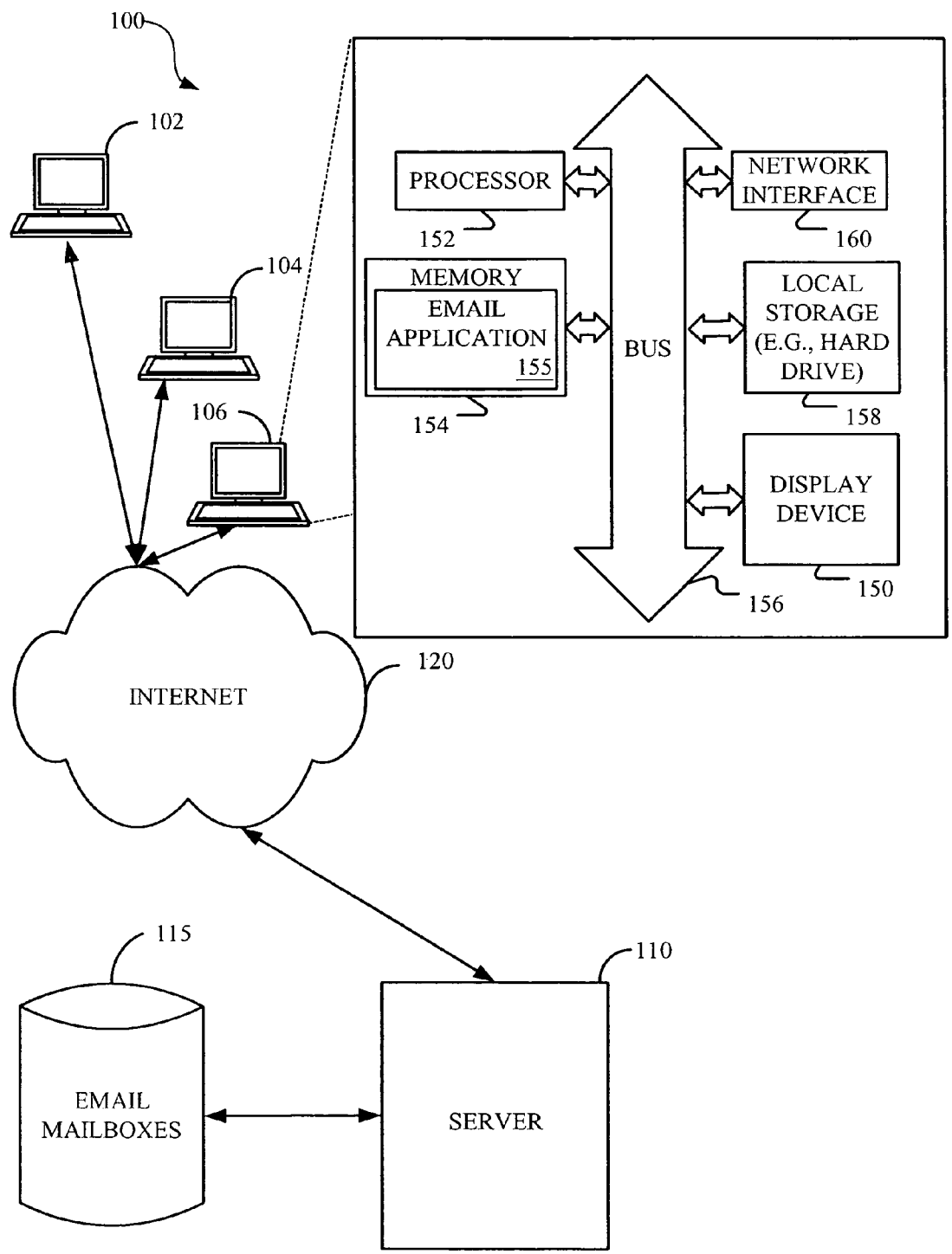
FIG. 1 is a block diagram of one embodiment of the detection management system.

Reference is now made in detail to the description of the embodiments as illustrated in the drawings. While several embodiments are described in connection with these drawings, there is no intent to limit to the embodiment or embodiments disclosed herein. On the contrary, the intent is to cover all alternatives, modifications, and equivalents.

The present disclosure provides communication systems and methods for managing the detection of undesired email messages. FIG. 1 is a block diagram of one embodiment of the detection management system 100. As shown in FIG. 1, the detection management system 100 comprises representative workstations 102, 104, 106 that are coupled to a server 110 over a network such as the Internet 120. The server 110 is coupled to a database 115 that stores email accounts (or mailboxes) of various users.

In the operating environment shown in FIG. 1, a sender of an email message generates the email message at a sender workstation 102 and sends the email message through a network 120 (via the server 110 and database 115) to a recipient at a recipient workstation 106. As shown in FIG. 1, the recipient workstation 106 includes a processor 152, a network interface 160, memory 154, a local storage device 158, and a bus 156 that permits communication between the various components. While not explicitly shown, it should be appreciated that the other workstations 102, 104 may also include similar components that facilitate computation or execution of applications on the workstations 102, 104. In some embodiments, the local storage device 158 may be a hard drive configured to electronically store data. The local storage device 158 may also store computer programs that execute on the recipient workstation 106. In this sense, the processor 152 is preferably configured to access any program that is stored on the local storage device 158, and execute the program with the assistance of the memory 154. In the embodiment of FIG. 1, an email application 155 is shown as being loaded into memory 154 for launching at the workstation 106, thereby permitting the workstations 106 to send and receive email messages through the network 120. Since the functioning of computing devices is well known in the art, further discussion of the processor 152, memory 154, and the local storage device 158 are omitted here. However, it should be appreciated that the memory 154 may preferably be either volatile or non-volatile memory.

The network interface 160 is configured to provide an interface between the recipient workstation 106 and the network 120. Thus, the network interface 160 provides the interface for the workstation 106 to receive any data that may be entering from the network 120 and, also, to transmit any data from the workstation 106 to the network 120. Specifically, in some embodiments, the network interface 160 is configured to permit communication between each of the workstations 102, 104, 106 and the server 110 and, additionally, to permit communication between the workstations 102, 104, 106 themselves. In this regard, the network interface 160 may be a modem, a network card, or any other interface that communicatively couples each of the workstations 102, 104, 106 to the network. Since various network interfaces are known in the art, further discussion of these components is omitted here. It should be understood that various aspects of the email application 155 may be conventional or may be custom tailored to specific needs.

Figure 2:
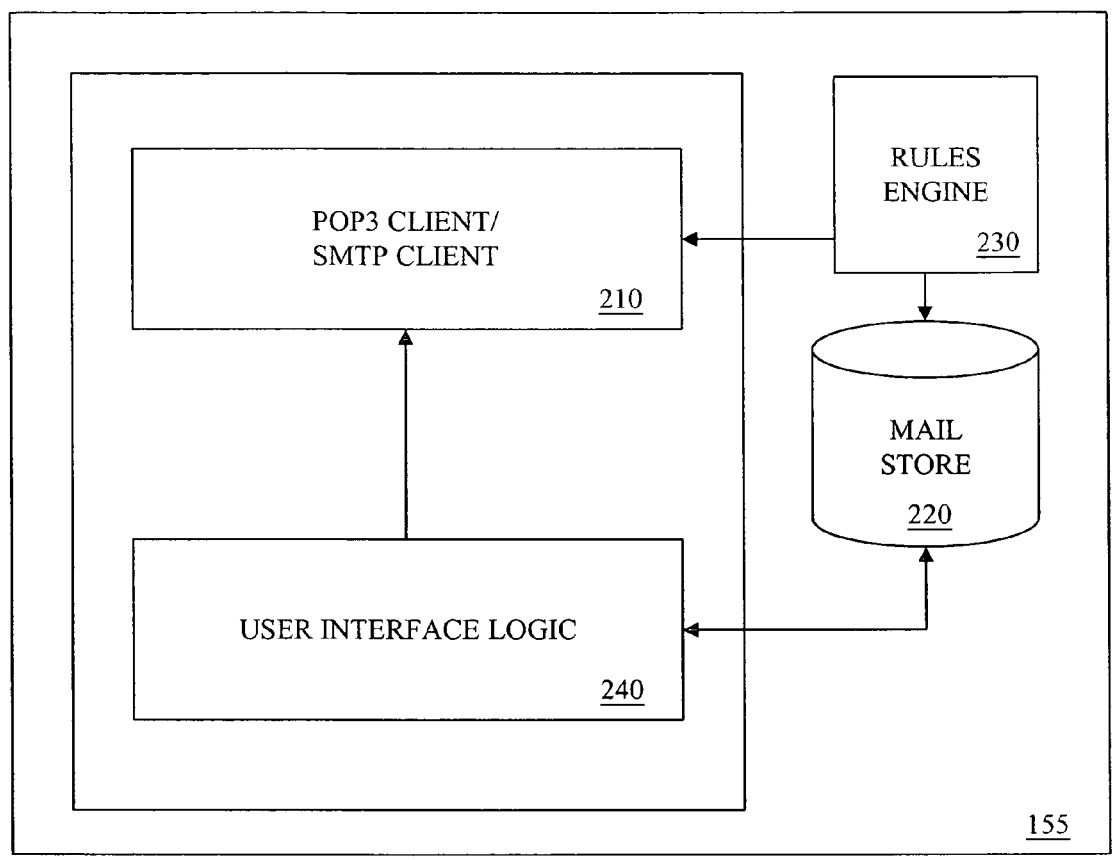
FIG. 2 is a block diagram of one embodiment of an email application for the detection management system of FIG. 1.

Referring now to FIG. 2, shown is a more detailed diagram of the email application 155 of FIG. 1. The email application preferably includes POP3 and SMTP components 210. As one skilled in the art will recognize, these protocols merely relate as examples to retrieving and sending email messages. As such, it is intended that other protocols and architectures that operate to send and retrieve email messages, such as IMAP4, among others, are intended to be included herein. For example, other alternative embodiments of the email application 155 include components for downloading of email messages that have been stored in a server 110 for a workstation 106 that has LAN or Web access.

The POP3 component 210 in this embodiment typically downloads email messages from the server 110 through the network interface 160, and stores the email messages in non-volatile storage which may be referred to as a mail store 220. A rules engine 230 sorts and filters the email messages according to specified rules before the email messages are deposited in the mail store 220. For example, one rule may stipulate that each email message should be examined to determine if the message is "spam," and another rule may specify that any message from a certain sender should be automatically deleted, etc. Note, the POP3 server in this embodiment can be set up to retrieve messages for more than one email account. Further, the term "spam" is being used to generally refer to any undesired email message that may be sent to a user, including unsolicited email messages, offensive email messages, etc., among others. Accordingly, spam messages may be sent from commercial and non-commercial senders.

User interface logic 240 included within the email application 155 can retrieve the messages from the mail store 220, format the information, and send the formatted information to the I/O display device 150. In particular, user interface logic 240 of this embodiment, among others, of the present invention is configured to parse the data retrieved from mail store 220. Specifically, user interface logic 240 can separate email messages according to an associated "To:" email address or "From:" email address, and display multiple mailboxes corresponding to several email addresses. User interface logic 240 is also preferably configured to display identification and summary information from each of the mailboxes, such as sender name and subject identification, as well as a summary of how many messages are contained in each of the subfolders of the mailboxes, among others. One skilled in the art will recognize that in practice, user interface logic 240 typically calls various functions within the operating system that are relayed through the processor 152 before being sent to the display device 150.

Figure 3:
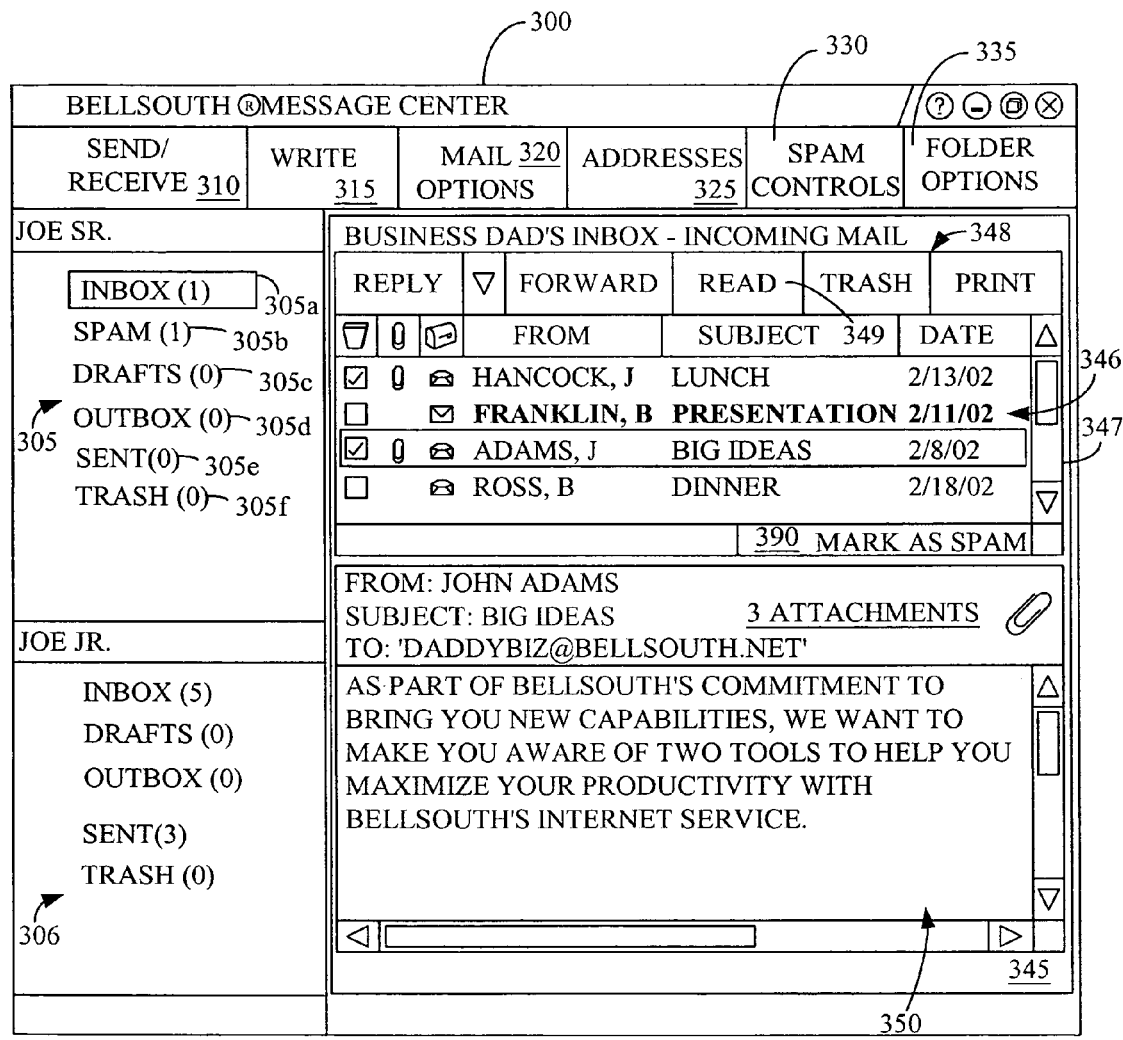
FIG. 3 is a diagram showing one embodiment of a message center for the user interface logic of FIG. 2.

FIG. 3 is a screen diagram display representing one embodiment of a message center 300 for the user interface logic 240 of FIG. 2. As shown in FIG. 3, the message center 300 for the user interface logic 240 comprises a send or receive selection button 310, a write selection button 315, a mail options selection button 320, an address book database selection button 325, a spam controls selection button 330, and a folder options selection button 335. For example, if a user selects the address book database selection button 325, then an address book user interface (not shown) is launched or instantiated as is commonly understood in the art. If the user selects the write selection button 315, then a compose window (not shown) is launched or instantiated as is commonly understood in the art. Similarly, if the user selects the send or receive selection button 310, then any prepared messages are sent and the designated mail servers for the user are checked for new mail, as is commonly understood in the art.

In addition to the selection buttons 310, 315, 320, 325, 330, 335 the message center 300 includes a display screen 345, which displays identifications 346 of received email messages in an identification panel 347 and preferably displays a preview pane 350 having a preview of a selected email message for an active persona (e.g, Joe, Sr., as opposed to Joe Jr., as shown). The display screen 345 also includes message response options 348 such as replying to the email message, forwarding the email message, reading the full email message (rather than merely previewing the email message in the preview pane), deleting the email message, or printing the email message. For example, if the user selects the read selection button 349, then a read window (not shown) is launched or instantiated as is commonly understood in the art. As known to those skilled in the art, there are many different ways to facilitate reading and writing a message, and the invention presented herein should not be limited to a particular method for displaying the text of a message or for composing a message.

The message center 300 also includes a folder list 305 having a plurality of folders which have various email messages that may be organized according to message type, such as an inbox folders 305*a*, spam folder 305*b*, drafts folder 305*c*, outbox folder. 305*d*, saved items folder 305*e*, trash folder 305*f*, etc. The message center 300 currently shows, for example, a folder list for Joe Sr. 305 and a folder list for his adolescent son, Joe Jr. 306. Note, the folder list of Joe. Jr. preferably does not have a spam folder. Accordingly, in some embodiments, spam messages that are intended for Joe. Jr. are automatically placed in the spam folder 305*b* of another user, such as a parent Joe. Sr. This operation is discussed later in reference to tag identifiers for spam messages.

Referring again to FIG. 3, upon selecting the folder options selection button 335, the user may configure and store unique folder options specifically for that user. In a similar manner, selection of the mail options selection button 320 may also provide customized mail settings (e.g., mail delivery rates) that may be customized according to different groupings of communications accounts and/or services. Similarly, if the user selects the spam controls selection button 330, then a user spam controls window (not shown) for configuring spam settings is launched or instantiated. The spam controls window preferably enables a user to effectively manage various spam detection schemes in a consolidated manner, as discussed below.

Figure 4:
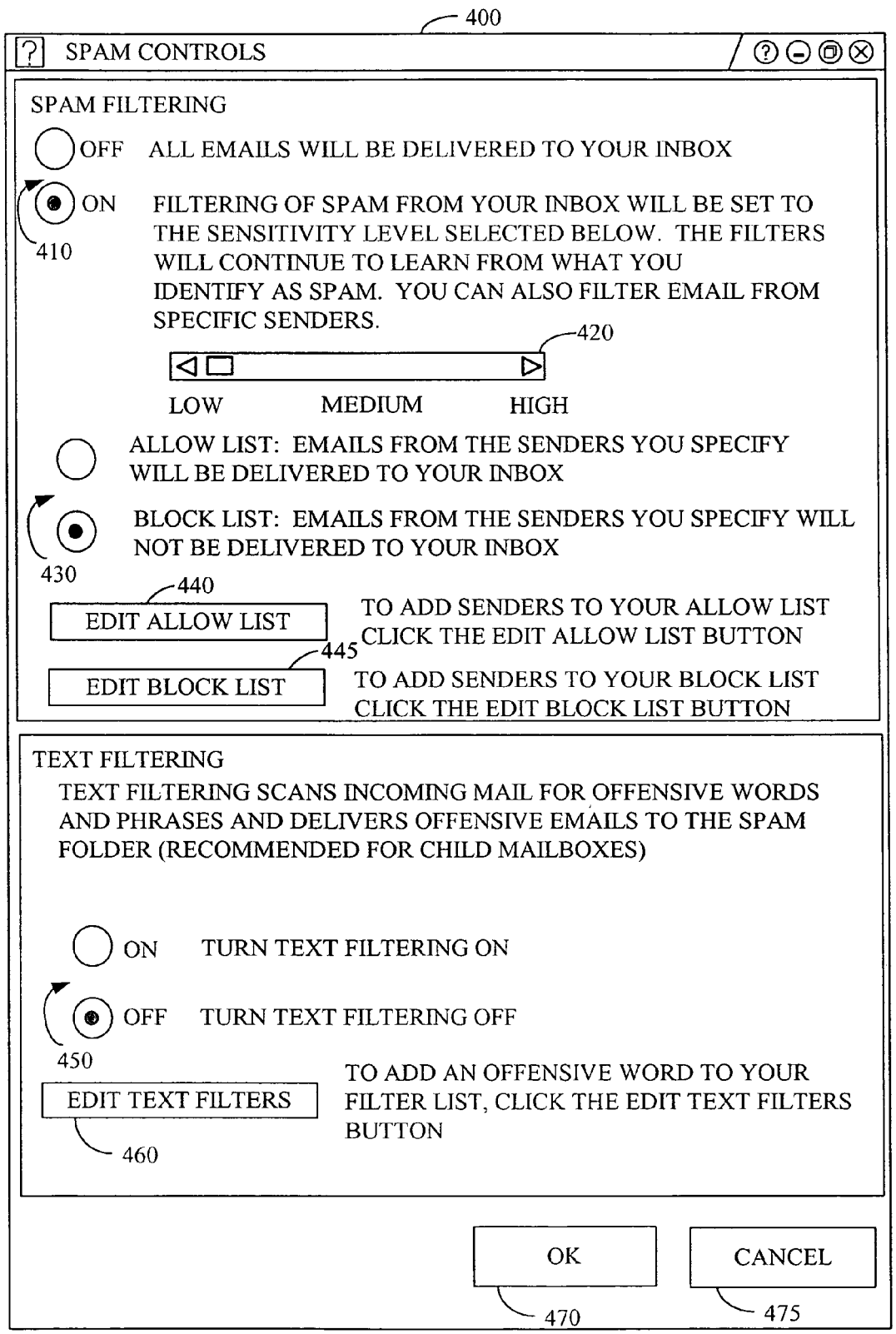
FIG. 4 is a diagram showing one embodiment for managing one or more spam detection schemes with the user interface logic of FIG. 2.

FIG. 4 is a diagram showing one embodiment of a user interface 400 for managing a plurality of spam detection schemes. As shown in FIG. 4, the user interface 400 comprises a radio-style selection button 410 to indicate if a user has activated spam filtering for email messages that are to be delivered to the user's inbox. Preferably, if enabled, spam detection mechanisms attempt to detect and filter out undesired email messages from incoming email messages before the email messages reach a user's inbox. The undesired email messages are typically stored in a user's spam folder 305b. In some embodiments, the rules engine 230 of FIG. 2 employs a variety of spam detection mechanisms. To wit, the rules engine 230 preferably executes rules that are intended to detect undesired email messages or spam. For example, the rules engine 230 may perform rules that attempt to recognize certain features that are prevalent in spam messages. Further, the rules engine 230 may perform rules that implement a statistical algorithm, such as a Bayesian-type, to determine if an incoming message may be spam, based upon the overall similarity between the incoming message and previous spam messages.

Accordingly in FIG. 4, the user interface 400 provides a sliding scale representation 420 whereby a user can specify the level of overall likelihood of spam (sensitivity of filtering) that is utilized in a statistical filtering algorithm. If the scale is positioned to the far left, than an incoming message that has a low level of similarity with previous spam messages will be determined to be spam. Accordingly, as the scale is moved to the right, the level of similarity is gradually increased, and thus, an incoming email message has to have a higher level of similarity with previous spam messages to be determined to be, and filtered out as, spam.

The user interface 405 further comprises radio-style selection buttons 430 that may be selected to activate/deactivate a mechanism for removing incoming messages that are from unauthorized senders. For example, a user may select the top selection button to indicate that an incoming email message that is not from an authorized list of senders should be designated as spam and stored in the spam folder for the user ("Joe Sr.") 305b. Accordingly, the user may select the edit allow list selection button 440 to add and remove senders from the "allow list," as shown below.

Figure 5:
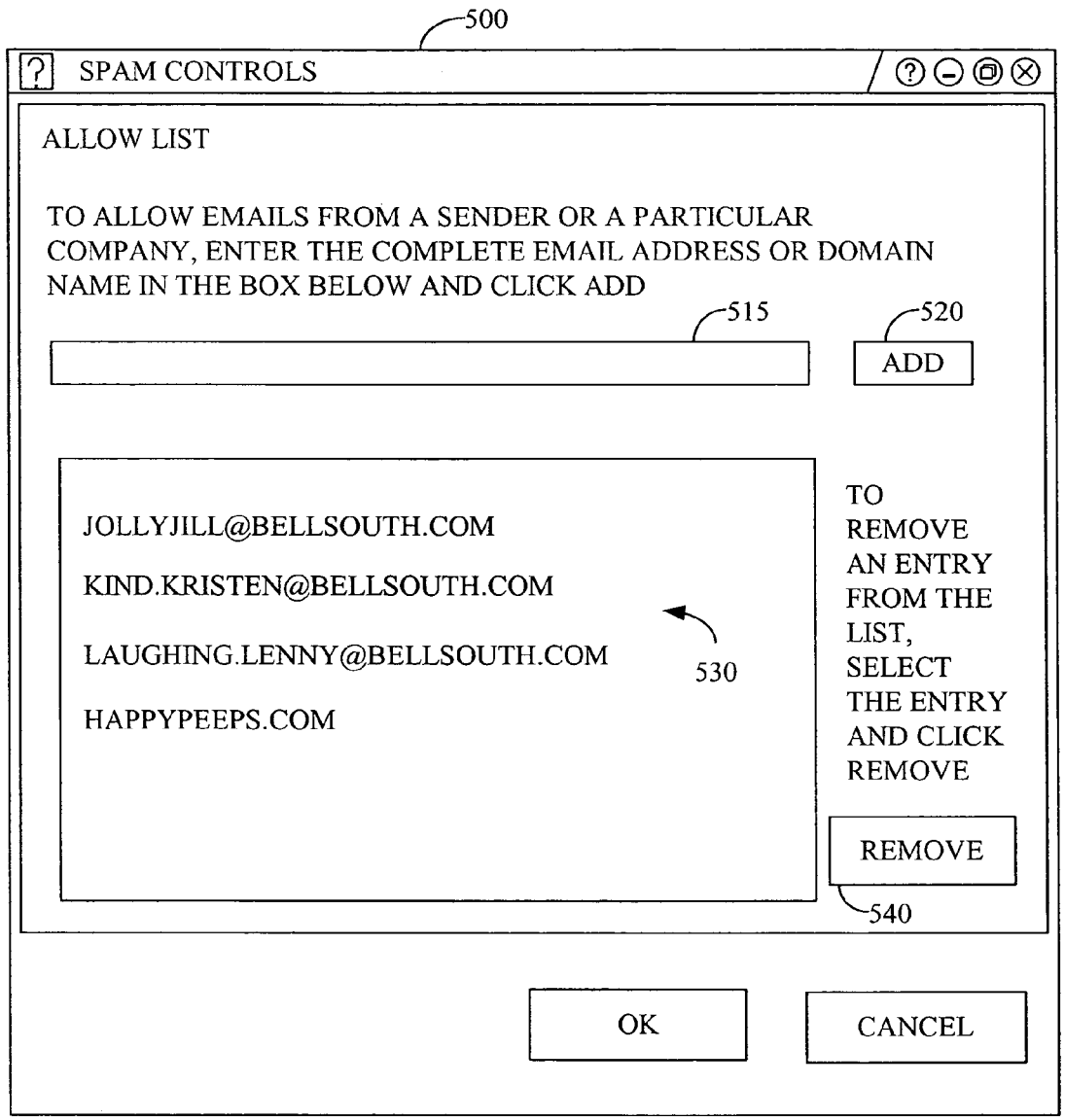
FIG. 5 is a diagram showing one embodiment for editing an allow list with the user interface logic of FIG. 2.

FIG. 5 is a diagram showing one embodiment 500 of a user interface for adding senders to, and removing senders from, the "allow list." To add a sender, the user may enter a complete email address or a domain name into the input box 515 and select the add selection button 520. Accordingly, the entered name will be added to the list of email addresses and domain names that make up the "allow list" 530. Further, a user may remove an email address or domain name that is on the allow list 530 by selecting the address/name (e.g., by highlighting the address/name) and selecting the remove button 540.

Referring back to FIG. 4, instead of authorizing senders from an allow list, a user may select the bottom radio-style selection button 430 to indicate that an incoming email message that is from a list of unauthorized senders should be designated as spam and stored in the spam folder for the user 305b. Accordingly, the user may select the edit block list selection 445 button to add and remove senders from the "block list," as shown below.

Figure 6:
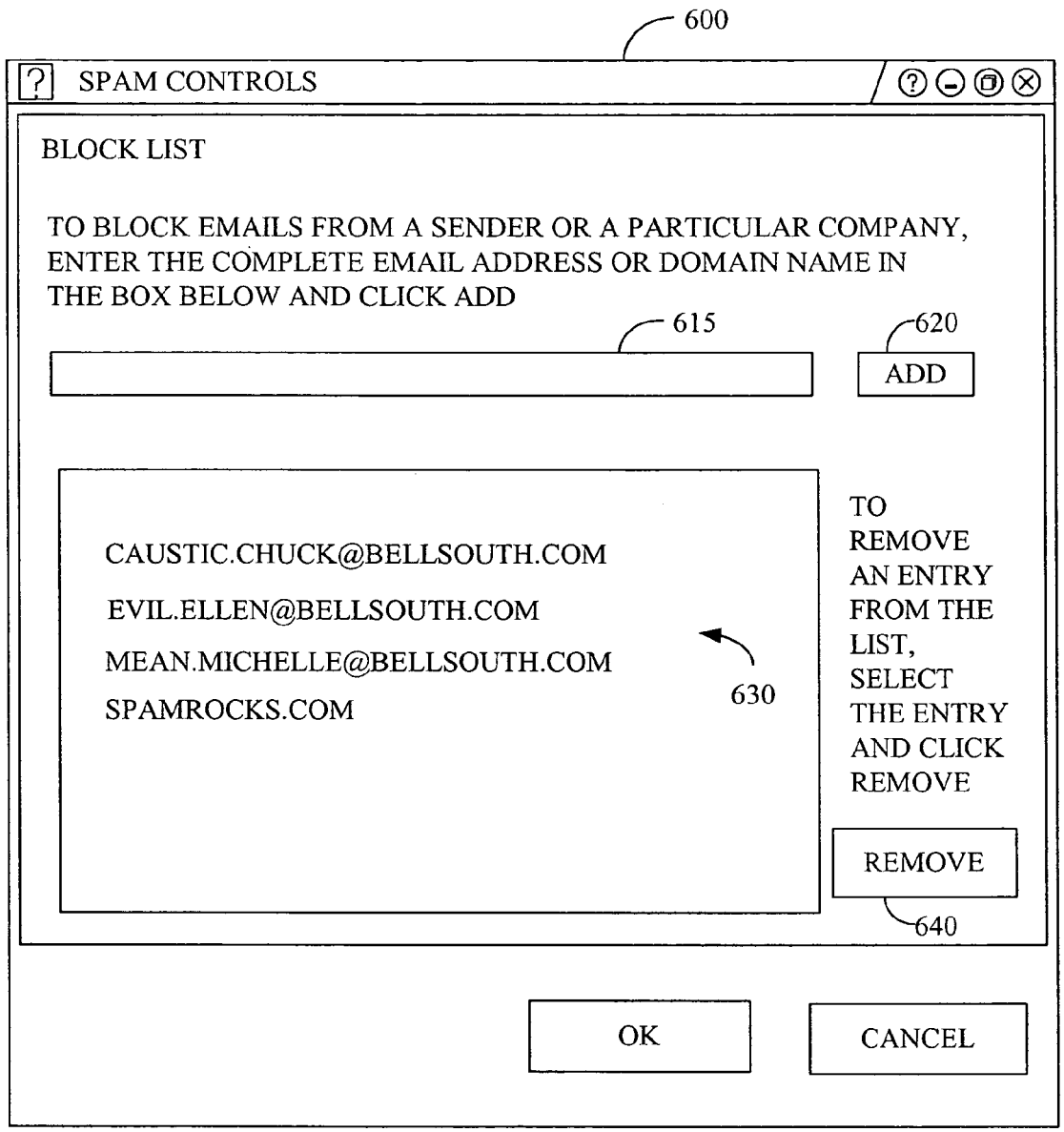
FIG. 6 is a diagram showing one embodiment editing a block lost with the user interface logic of FIG. 2.

FIG. 6 is a diagram showing one embodiment 610 of a user interface for adding senders to, and removing senders from, the "block list." To add a sender, the user may enter a complete email address or a domain name into the input box 615 and select the add selection button 620. Accordingly, the entered name will be added to the list of email addresses and domain names that make up the "block list" 630. Further, a user may remove an email address or domain name that is on the block list 630 by selecting the address/name (e.g. by highlighting the address/name) and selecting the remove button 640.

Referring back to FIG. 4, the user interface 400 further comprises radio-style selection buttons 450 to activate/deactivate a text filtering mechanism. For example, a user may select the top selection button 450 to indicate that the textual content of an incoming email message should be checked against a list of offensive words and phrases. If an incoming email message is determined to contain a word or phrase that has been deemed offensive, than the email message is stored in a spam folder 305b. Typically, the list of objectionable words and phrases has been pre-compiled and does not have to be created by the user. However, a user may modify the list by adding or removing words or phrases from the list. For example, to add an offensive word or phrase to the objectionable word/phrase list, a user may select the edit text filter button 460, as shown below.

Figure 7:
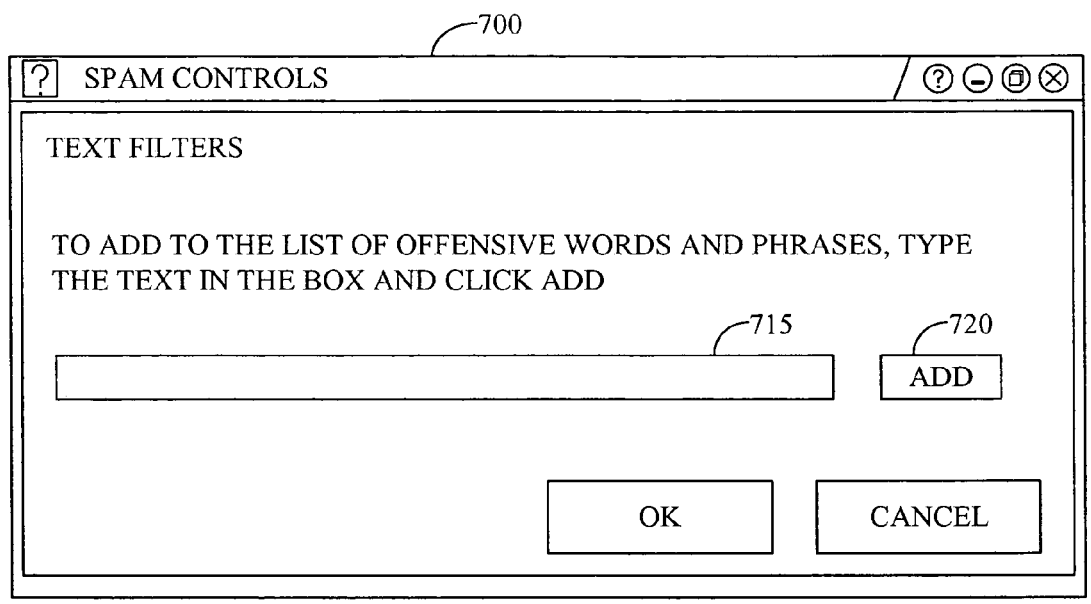
FIG. 7 is a diagram showing one embodiment for adding an objectionable word or phrase to an objectionable word and phrase list with the user interface logic of FIG. 2.

FIG. 7 is a diagram showing one embodiment 700 of a user interface for adding an objectionable word or phrase to the objectionable word and phrase list. To add a word or phrase, the user may enter the word or phrase into the input box 715 and select the add selection button 720. Accordingly, the entered word or phrase will be added to the list of objectionable words and phrases. An alternative mechanism for adding or removing a word or phrase to the objectionable word and phrase list may be associated with the spam folder 305b and is discussed later in reference to FIG. 9A.

Referring again to FIG. 4, after a user has provided selections for each of the spam filtering techniques, the user may confirm his or her selections by selecting the OK button 470. Otherwise, the user may nullify his or her selections by selecting the cancel button 475. In other embodiments, different spam detection schemes may also be employed on a single graphical control or window interface. For example, another type of spam detection mechanism, not previously mentioned, allows messages from designated senders who have been specified on a particular list of senders by the user and then allows messages from senders who are not on the particular list to be processed by other spam detection schemes. In this way, the user is able to still receive messages from senders that are not on the particular list, as long as the messages are not designated as spam by another spam detection mechanism. In some embodiments, among others, the particular list of senders provided by the user is the user's address book of email addresses. Further, some embodiments verify that a sender (who is in the user's address book) of a received email message is legitimate by performing a Domain Name Server (DNS) look-up of the domain name of the Simple Mail Transfer Protocol (SMTP) server (using the originating IP address in the received email message header) that was used to originally send the email message. Then, the domain name of the SMTP server is compared to the listed domain name of the sender in the From: field of the email message to insure that the domain name of the actual sender of the email message is the same as the listed domain name in the From: field.

Accordingly, in some embodiments, among others, a user may specify various combinations of spam detection schemes to provide varying security levels of spam protection. For example, in the embodiment shown in FIG. 4, spam detection schemes involving a statistical filtering algorithm 420 and a block list 430 have been activated, while a spam detection scheme involving an allow list 430 and text filtering 450 has not been activated. Next, some techniques for modifying particular spam detection scheme settings are discussed below.

Figure 8:
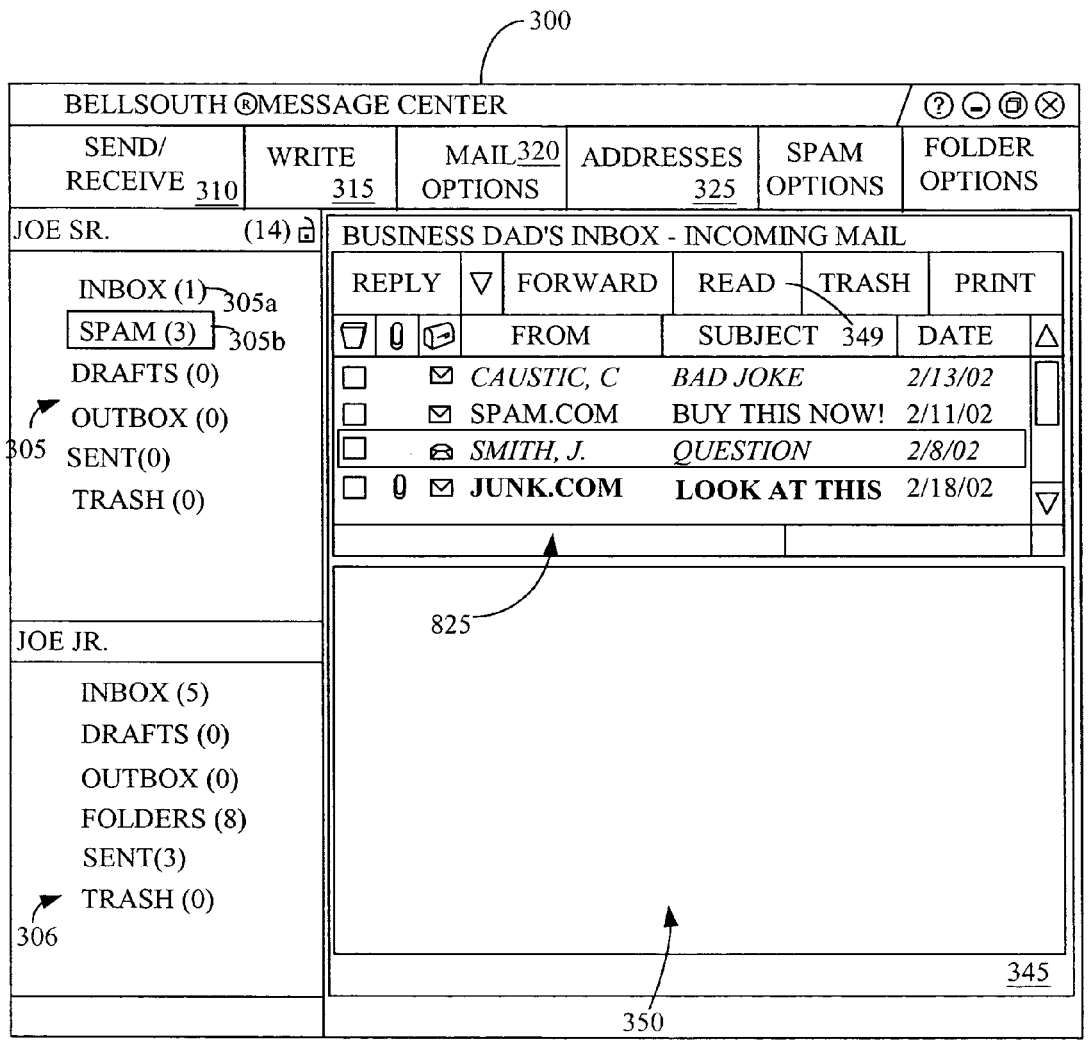
FIG. 8 is a diagram showing one embodiment of the message center for the user interface logic of FIG. 2.

FIG. 8 is a diagram showing one embodiment of the message center 312 for the user interface logic 240 when the spam folder 305b has been selected for viewing. In this regard, once the spam folder 305b has been selected, identifications 825 of the email messages contained in the spam folder 305b are presented to the user. As shown in FIG. 8, the spam folder 305a, which belongs to Joe Sr., contains email messages from C. Caustic, spam.com, J. Smith, and junk.com. For spam folder 305b, the feature of displaying a preview of a selected message has been disabled in some embodiments, since the contents in a spam folder has been determined to be objectionable or undesired. Hence, in the example of FIG. 8, if J. Smith's email message is selected, then the contents of that email message may not be displayed in the preview window 350 below the list of email messages. Further, when the spam folder has been selected for viewing, the mark as spam button 390 of FIG. 3 is disabled and/or hidden, since the messages in the spam folder 305b have already been marked as spam. However, a message in a spam folder 305b may be viewed by using the message center 300 to select a message from the spam folder 305a and then selecting the read button 349. A read window will then open, enabling the user to read the text associated with the selected message, as discussed below.

Figure 9A:
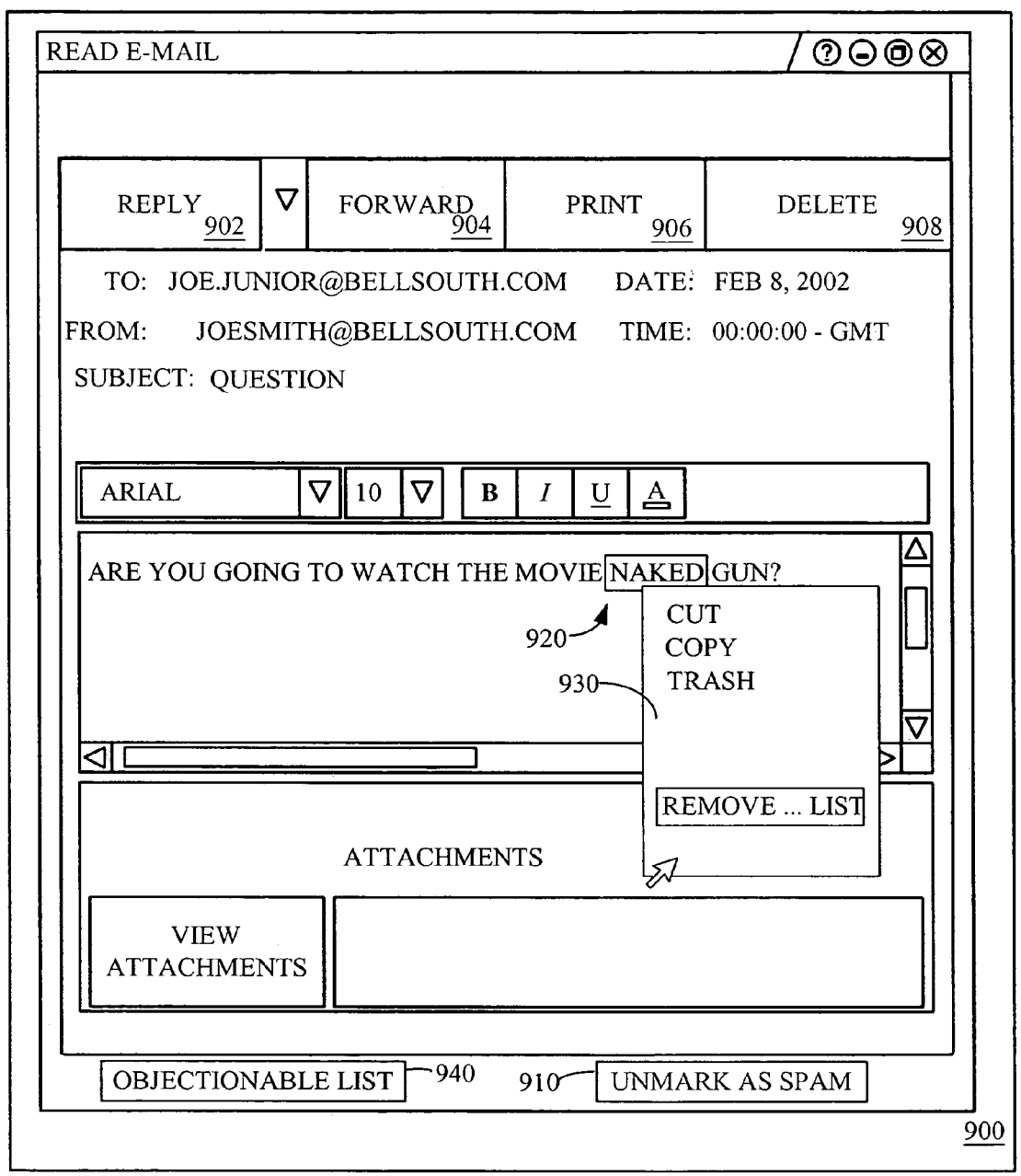
FIG. 9A is a diagram showing one embodiment of a read window for the user interface logic of FIG. 2.

FIG. 9A is a diagram showing one embodiment of a read window 900 for user interface logic 240 when a message from a spam folder 305b has been selected. As shown in FIG. 9A, one embodiment of the read window 900 comprises several selection options that a user may select. For example, a user may select an email reply button 902, an email forward button 904, a print button 906, and a delete button 908 from the email read window 900. Since these functions are well known in the art, further discussion of email reply, email forward, print, and delete functions are omitted here. However, it is worthwhile to note that, unlike prior systems, the selection of the unmark as spam button 910, in some embodiments, permits the user to move a message that has been marked as a spam message and stored in the spam folder 305b to the inbox folder 305a of the user (Joe, Sr.).

Figure 10:
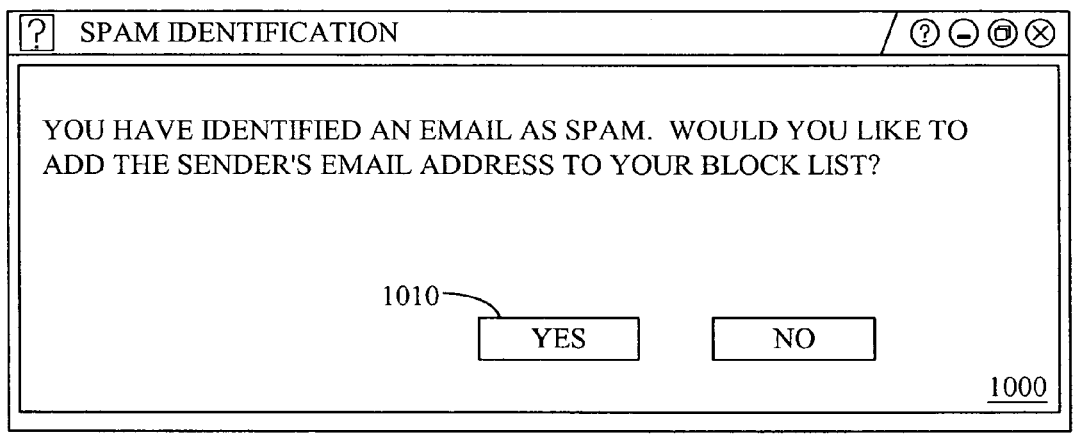
FIG. 10 is a diagram showing one embodiment of a user interface for adding the sender of the particular message to a block list of FIG. 6.

Correspondingly, as shown in FIG. 3, the selection of a non-designated spam folder (e.g., inbox folder) allows the user to select the mark as spam button 390 to move a message in the non-designated folder to the spam folder and to have the message marked and designated as spam. Once a message has been manually marked as spam by the user, the user may also be presented with a user interface 1000 for adding the sender of the particular message to the block list, as shown in FIG. 10. By selecting the yes button 1010, the full email address of the sender is added to the block list 630.

Of further note, within the text of a message that has been marked as spam, the words or phrases that were detected by the text filtering mechanism may be highlighted 920, as shown. Moreover, in some embodiments of the user interface 900, a user may use a mouse or keyboard to perform a "right click" operation to select a remove from list option 930 to indicate that the user would like the highlighted word/phrase to be removed from the list of objectionable words and phrases, as shown in FIG. 9A. Correspondingly, a user may select a word that has not been highlighted within the text of the message and may manually highlight the word or phrase. Then, the user may perform a "right click" operation on the word or phrase and select an "add to list" option (not shown) to indicate that the word or phrase should be added to the list of objectionable words and phrases. Accordingly, this operation may be performed with regard to messages in other folders besides the spam folder 305b.

As discussed above, certain incoming email messages may be stored in the spam folder 305b. Thus, when the user (Joe Sr., in the example of FIG. 3) selects the spam folder 305b, then a list 825 of spam email message identifications is displayed to the user. Note, each email message that is stored in the spam folder 305b is preferably embedded with an indicator (e.g., a particular tag, marker, etc.) that shows that the message has been designated as a spam message. Further, each email message in the spam folder 305b is preferably identified with a separate indicator for each of a variety of spam detection schemes. For example, if the email messages from both J. Smith and C. Caustic were determined to be spam or undesired email messages because each email message contains words or phrases in the list of objectionable words and phrases, then the email messages from J. Smith and C. Caustic may contain a first indicator associated with a text-filtering detection scheme. Alternatively, if the email message from spam.com was determined to be spam because the spam.com domain name is on the block list of the user, then the email message from spam.com may have a second indicator associated with a block list detection scheme. Accordingly, additional indicators may be associated with other spam detection schemes. For example, various other spam detection schemes include spam filters based on various methodologies or algorithms, manual detection by a user, etc.

Further, each identification of an email message that is marked by a particular indicator may be displayed in a particular manner within the spam folder 305a by the message center 300 (e.g., displayed with a particular font, style, color, etc.). For example, an identification of spam message that contains a first indicator may be displayed with italic lettering, as shown in FIG. 8. Alternatively in some embodiments, for example, identification of a spam message that contains a first indicator may be displayed in a particular color, while identification of a spam message embedded with a different indicator may be displayed in a different color. For example, a spam email identification displayed in a blue color may be associated with a block list detection scheme. Hence, by viewing the appearance of an identification of a spam message, a user may determine the type of spam detection scheme that designated the message as spam and caused the message to be placed in the spam folder 305b. Other embodiments include appearance modifications for email messages themselves. Therefore, if the user discovers that a "desired" message was placed in the spam folder, the user can readily determine which particular detection scheme designated the message as spam. Accordingly, the user may alter the settings or parameters of the particular detection scheme to prevent a similar situation from reoccurring. For example, if a particular message was designated to be spam, the user may ascertain from the look or appearance of the identification of the message (e.g., displayed in an orange color) that the message was deemed to be spam because of the message contained a certain word that was in the objectionable word list of a text-filtering detection scheme. Therefore, the user may remove the word from the list, as discussed in reference to FIG. 9A.

A user in some embodiments may drag identifications of email messages between the user's inbox folder 305a and spam folder 305b in either direction (e.g., via a drag and drop operation). Accordingly, the drag and drop operation of moving a message identification from a spam folder 305b to the inbox folder 305a automatically removes the indicator of a particular detection scheme that previously marked the message as a spam message. Further, the user may be prompted to update or adjust the settings or preferences of the particular detection mechanism after the drag and drop operation.

For example, the rules engine 230 may place a particular email message in a user's spam folder 305b because the sender of the particular email message was on the user's block list 630. However, the user may later drag the email message identification from the spam folder 305b to the inbox folder 305a. Accordingly, user interface logic 240, upon detecting the drag and drop operation, may activate a mechanism for prompting the user to adjust settings for the particular detection scheme that was associated with the particular email message. For example, if the particular email message was previously marked with an indicator of the block list detection scheme, the user may be prompted to remove the sender from the user's block list 630. Alternatively, if the particular email message was previously marked with an indicator for the text-filtering detection scheme, the user may be prompted to remove the word or phrase that caused the email message to be marked as spam from the list of objectionable words and phrases, for example. Correspondingly, after the email message has been removed from the spam folder 305b, the current content of all the email messages in the spam folder 305b may then be re-examined according to a statistical alogrithm, such as a Baysesian-type, since the content of the spam folder 305b has changed.

In the inverse operation of dragging an email message identification from the inbox 305a to the spam folder 305b, the contents of the spam folder 305b, after the email message has been removed from the inbox and added to the spam folder 305a, are also examined under a statistical algorithm, such as a Bayesian-type. Accordingly, user interface logic 240 upon detecting the drag and drop operation may activate a mechanism for prompting the user to mark the email message as a certain type of spam using an indicator associated with one of the particular detection scheme mechanisms.

For example, if a user moves a particular email message from the inbox 305a to the spam folder 305b because of a particular objectionable word in the particular email message, the user may be prompted to specify that the particular email message has been determined to be spam because of an objectionable word or phrase. Accordingly, the email message may be marked with an indicator for the text-filtering detection scheme (that detects objectionable words and phrases).

Further, upon selection of a particular type of spam, the user may be prompted to adjust the settings associated with the particular spam detection scheme that detects that particular type of spam. Accordingly, in the present case, the user may prompted to add the particular objectionable word to the list of objectionable words and phrases utilized by the text-filtering detection scheme. Alternatively, for other types of spam, the user may prompted to adjust other settings, such as adding a sender of an email message to the user's block list 630.

Typically, the format of an email message contains markers or tags (e.g., to: tag, cc: tag, etc.) to instruct an email application 155 on how the message should appear on a display device 150 when shown. Accordingly, in some embodiments of the invention, special tag or marker indicators are placed within the format of the respective email messages to identify an email message as a spam message. Further, special tag indicators are also placed within the format of respective email messages to indicate that the message was detected by a particular spam detection scheme. Referring back to FIG. 2, the rules engine 230 may perform a rule designed to detect an incoming spam message. Further, the rules engine 230 may perform more than one rule that is directed toward detecting spam messages. For example, one rule may implement a Bayesian filtering approach and another rule may implement a text-filtering approach, for example.

Accordingly, if a particular spam message is detected by the rules engine 230, then the rules engine 230 may be configured to insert a special marker or tag identifier into the format of the particular spam message to indicate it as such (i e., a particular spam message). In addition, user interface logic 240 may be directed to insert a special marker or identifier tag into the format of an email message that the user wants to manually designate as a spam message, as discussed previously. Therefore, the user interface logic 240 can later recognize that the message is spam by recognizing the special identifier tag in its formatting. Extensible markup language (XML) is one language, among others, that may be used to describe the contents of an email message by using markers or tags, according to the previously described embodiments.

Note, the user interface logic 240 may also perform particular operations that are associated with a particular marker or tag identifier contained in an email message. For example, in some embodiments, a read window may show an email message that has a tag identifier associated with a text-filtering detection scheme and highlight the words within the message that are contained on a list of objectionable words and phrases. However, this operation may not be performed for spam messages detected by other detection schemes and associated with other tag identifiers.

In addition, a spam message that is intended for a user who has been classified as a "child" may be stored in spam folder of a parent or some other designated user. For example, a message intended for a child may be marked with a tag or marker that indicates that the intended recipient is a "child." Accordingly, the same message may be marked by an identifier that designates the message as spam. Therefore, a particular operation may be performed for messages that contain both the child tag and the spam identifier. To wit, user interface logic 240 may be configured to detect the "child" marker and the "spam" marker in message and upon detection, perform the operation of moving the message to the spam folder of another user, such as a parent of a the user. Correspondingly, a user interface of the other user ("adult") may represent the spam messages of the child in a different manner than spam messages of the adult, since both types of messages may be stored in a single spam folder of the adult.

Figure 9B:
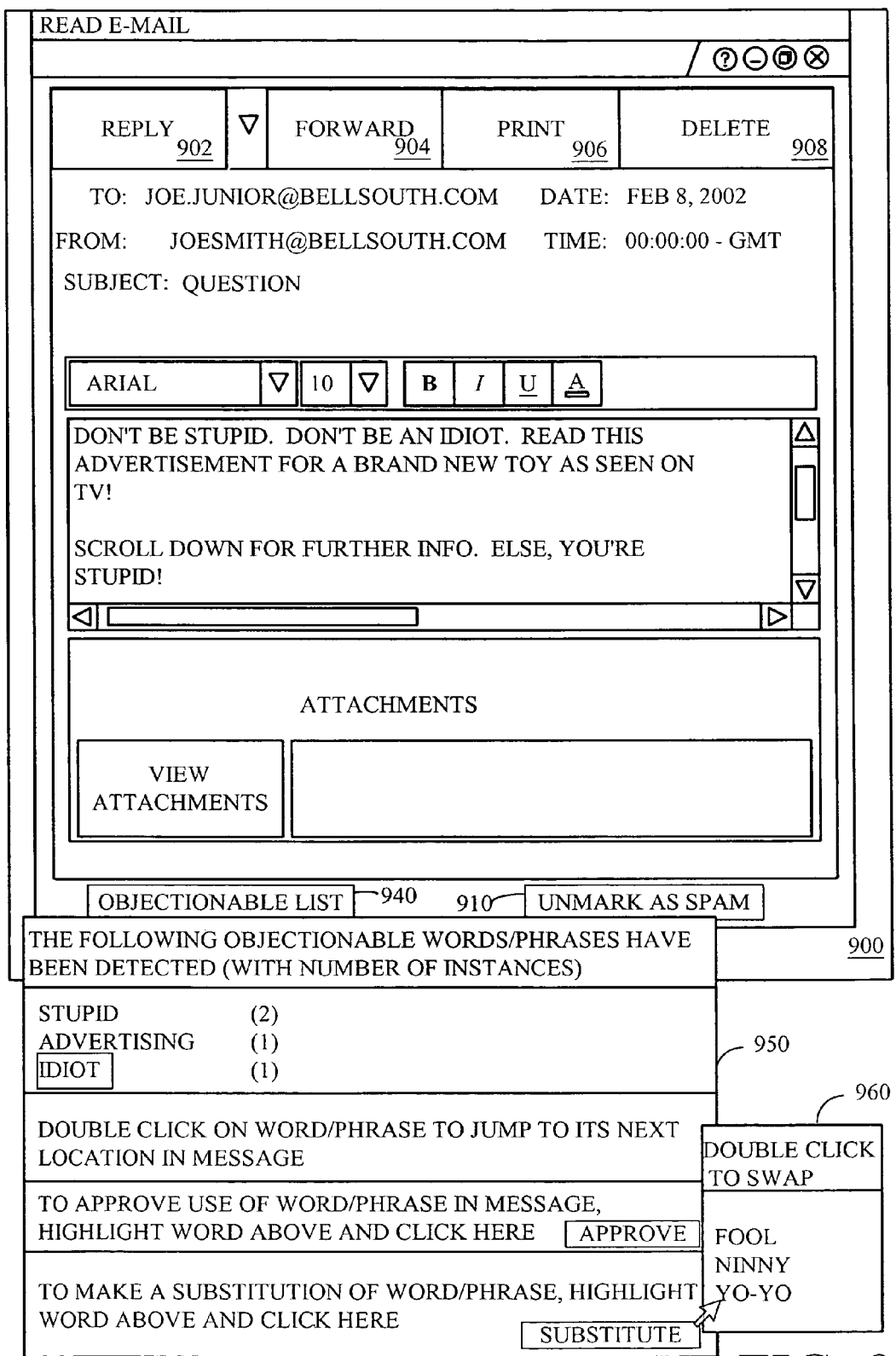
FIG. 9B is a diagram showing one embodiment of a read window for the user interface logic of FIG. 2.

As shown in FIG. 9B, alternative embodiments of the user interface 900 may provide a button 940 to activate a mechanism 950 for displaying a list of the particular objectionable words and phrases that are contained within a particular email message and how many instances each objectionable word or phrase occurred. By clicking on the particular word or phrase in the list, a user may advance to the particular instance in the message to review the word and surrounding text. Further, the user may directly remove, replace, or skip (allow once) the instance of the usage of the particular word or phrase in the message via the mechanism 950. In this manner, the user may clean up and sanitize the email message. For example, to replace a word or phrase, a mechanism 960 for substituting a word may be activated from the mechanism 950 for displaying a list. Accordingly, the mechanism 960 for substituting a word presents alternative words that can be substituted for the objectionable word or phrase.

Consider, an email message that is intended for a child and has been determined to be spam by the rules engine 230. If the email message was detected by a text-filtering mechanism, the email message may be cleaned by an adult user, for example. In some embodiments, after the email message has been reviewed and sanitized according to the adult user's level of satisfaction, the adult user may drag and drop the email message to the child's inbox folder. In other embodiments where the email message is located in the adult user's spam folder 305*b*, after the email message has been reviewed and sanitized according to the adult user's level of satisfaction, the adult user may unmark the email message as spam which causes the message to automatically move to the child's inbox.

Figure 11:
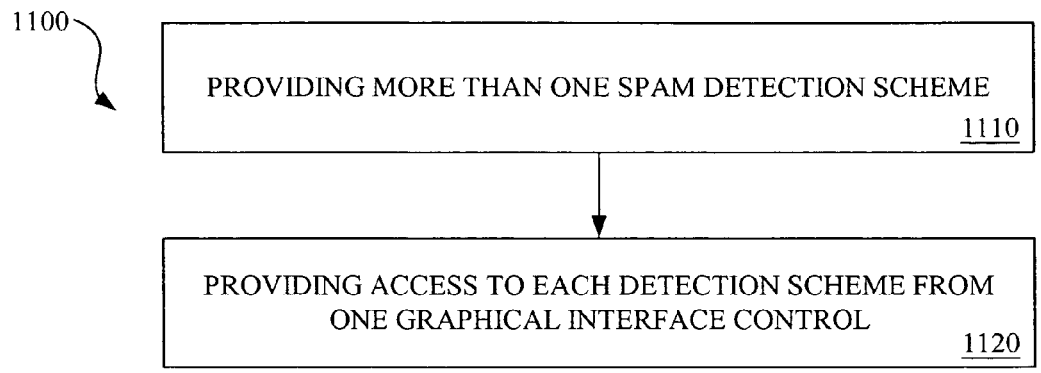
FIG. 11 is a flowchart showing one embodiment of a method for managing spam detection schemes of an email application of FIG. 1.
Figure 12:
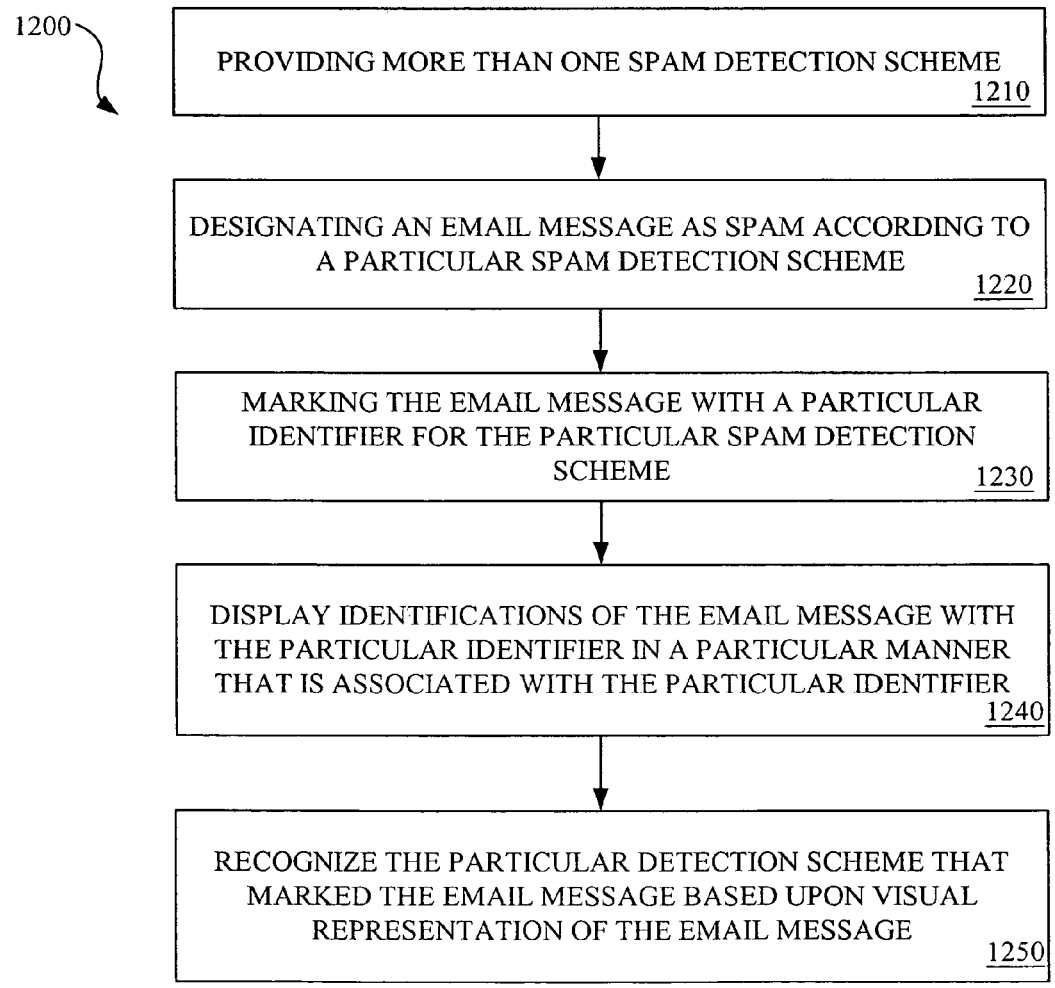
FIG. 12 is a flowchart showing one embodiment of a method for visually representing a spam message according to a particular spam detection scheme of FIG. 4.

Having described several embodiments of systems for effectively managing various spam detection schemes in a consolidated manner, attention is turned to FIGS. 11-12 which show several embodiments of methods for managing spam detection schemes. FIG. 11 is a flowchart showing an embodiment of a method for managing spam detection schemes of an email application. In this embodiment, the process (1100) comprises the steps of providing (1110) multiple spam detection schemes by an email application. Next, access to each spam detection scheme is provided (1120) from a single control window or graphical interface control.

FIG. 12 is a flowchart showing an embodiment of a method for visually representing a spam message according to a particular spam detection scheme. In this embodiment, the process (1200) comprises the step of providing (1210) multiple spam detection schemes or approaches. Further, the process comprises designating (1220) an email message as spam according to a particular detection scheme. The next step includes marking (1230) the email message with a particular identifier of the particular detection scheme. Then, the identification of the email message with the particular identifier is displayed (1240) in a particular manner that is associated with the particular identifier. For example, an email message (or identification) that is associated with a particular identifier may be displayed in a certain font, style, color, etc. that is associated with the particular identifier. Accordingly, another identifier associated with another detection scheme may cause an email message (or identification) to be displayed in a different font, style, color, etc. Hence, the process (1200) may also include the step of recognizing (1250) which particular detection scheme designated the email message as spam based upon the visual representation or depiction of the email message.

Figure 13:
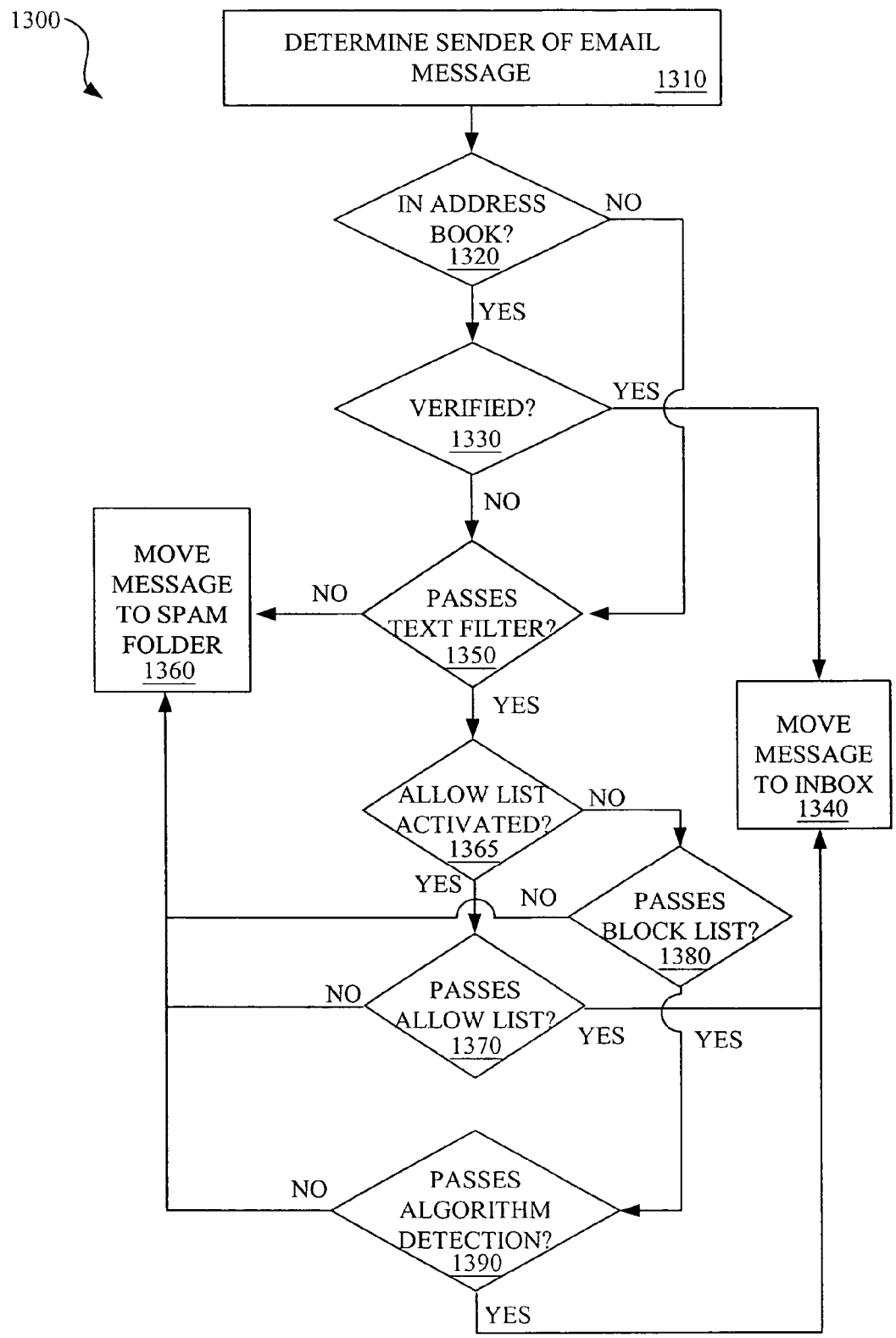
FIG. 13 is a flowchart showing one embodiment of a method for detecting an undesired email message using a plurality of spam detection schemes.

FIG. 13 is a flowchart showing one embodiment, among others, of a method for detecting an undesired email message. In this embodiment, the process (1300) comprises several detection schemes that have been activated by the user or an administrator of the user's email settings and services. In other embodiments, however, a user or administrator may not have each of the detection schemes activated as shown or may have different types of spam detection schemes that are available to be activated.

In the embodiment shown in FIG. 13, the process (1300) comprises the step of determining (1310) the sender of an email message, as has been previously described. Preferably, identification of the sender is obtained from the header of the email message. If the identification of the sender provided from the email message matches (1320) a person's identification in the address book of a user, then an attempt is performed to verify (1330) the identification of the sender in the email message as the actual sender of the email message, as previously described. After the sender of the email message has been verified to be a person who is listed in the user's address book, the email message has been determined to not be spam (e.g., an undesired email message) and is moved (1340) to the inbox of the user (or, in other embodiments, left to remain in the inbox). Alternatively, if the identification of the sender (from the email message) is not (1320) in the address book of the user or is not verified (1330) to be the actual sender, then the email message is further examined to determine if the email message is spam.

Accordingly, the email message is checked (1350) to determine if the content of the email message contains any words that have been determined to be objectionable by the user or an administrator (hereinafter, referred to as a text filter). If the email message is detected to contain undesirable words by the text filter (1350), the email message is determined to be spam and is sent (1360) to a spam folder of the user or another designated user (such as a parent of a user). Alternatively, if the email message passes the text filter or is not detected to contain any undesired words by text filter, the process (1300) continues to allow the email message to be further examined by other spam detection schemes.

Correspondingly, the sender (as identified by the header of the email message) is checked (1370) against an allow list, as previously described, if the allow list detection mechanism has been activated (1365). Accordingly, if the sender is included on the allow list (1370), then the email message is determined to not be spam and is moved (1340) to the inbox of the user (or, in other embodiments, left to remain in the inbox). Alternatively, if the sender is not included on the allow list (1370), the email message is determined to be spam and the email message is sent or moved (1360) to the spam folder of the user or another designated user. Note, in the embodiment shown in FIG. 13, when the spam detection scheme of checking against an allow list is activated, then the spam detection scheme of checking against a block list is not performed. Accordingly, if the spam detection scheme of checking against an allow list is not activated (1365), then the step of checking against a block list is performed (1380). In other embodiments of the invention, checking against both an allow list and a block list may be enabled, checking against both an allow list and a block list may be enabled, in which case the allow list would not exclude email messages.

Next, the process (1300) continues by checking the sender of email message against a block list, in step 1380, as previously described. If the sender is included in the block list, the email message is determined to be spam and is moved (1360) to the spam folder of the user or another designated user. Alternatively, if the sender is not included (1380) in the block list, the email message is checked (1390) against a statistical filtering algorithm that is used to detect undesired email messages, as previously described. Correspondingly, if the statistical filtering algorithm determines (1390) the email message to be spam, then the email message is moved (1360) to the spam folder of the user or another designated user. Alternatively, if the statistical filtering algorithm determines (1390) the email message to not be spam and passes the email message, the email message is moved (1340) to the inbox of the user (or, in other embodiments, left to remain in the inbox).

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art.

The email application 155 and mail store 220 may be implemented as a computer program, which comprises an ordered listing of executable instructions for implementing logical functions. As such the email application 155 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CD-ROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the invention as described may be made. All such changes, modifications, and alterations should therefore be seen as within the scope of the disclosure. It should be emphasized that the above-described embodiments of the present invention, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles herein. All such modifications and variations are intended to be included herein within the scope of this disclosure.

The invention claimed is:

1. An email system for providing email service to a user, comprising:
   a computer device of the user configured with a plurality of detection mechanisms that detect undesired email messages that have been received by the user from an email server,
   the computer device configured to tag a received email message with a marker indicating that that the email message is addressed to a child user,
   the computer device further configured to tag a received email message with a marker indicating that an email message was detected by a particular detection mechanism as being undesired;
   a user interface installed on the computer device and configured to visually represent a plurality of mail folders associated with a plurality of users that access email messages using the user interface, the plurality of users comprising at least the child user and the user designated to regulate the child user's access to his or her undesired email messages, the plurality of mail folders comprising at least an inbox folder for the child user and an inbox folder and an undesired mail folder for the user, wherein undesired email messages for the child user are represented as being located in the user's undesired mail folder; and
   a display device coupled to the computer device, the user interface configured to visually represent that a particular undesired email message was detected using a particular detection mechanism, wherein each of the detection mechanisms is represented using a different visual representation on the display device and the user interface upon detecting a drag and drop operation to move an email message from an inbox folder of the user to a designated folder where the undesired email messages are stored prompts for the moved email message to be marked as a type of undesired email message that is associated with one of the detection mechanisms,
   the user interface further configured to visually represent in the undesired mail folder of the user an undesired email message intended for the child user having both a child marker and a distinct marker of a particular detection mechanism in a different manner than undesired email messages intended for the user having only the distinct marker for the particular detection mechanism.

2. The system of claim 1, wherein the plurality of detection mechanisms includes a mechanism that refuses to detect an email message if the sender of the email message is on a list of senders authorized by the user.

3. The system of claim 1, wherein the plurality of detection mechanisms includes a mechanism that detects an email message if the sender of the email message is on a list of unauthorized senders.

4. The system of claim 1, wherein the plurality of detection mechanisms includes a mechanism that detects an email message if the email message contains a textual content string that is on a list of unauthorized textual content strings.

5. The system of claim 1, wherein the plurality of detection mechanisms include a mechanism that is configured to:
   analyze the overall content of previous email messages that have been detected; and
   detect an email message if the content of the message is similar to the overall content of the previous messages.

6. The system of claim 1, wherein the plurality of detection mechanisms include:
   a first detection mechanism that detects an email message if the sender of the email message is not on a list of senders authorized by the user;
   a second detection mechanism that detects an email message if the sender of the email message is on a list of unauthorized senders;
   a third detection mechanism that detects an email message if the email message contains a textual content string that is on a list of unauthorized textual content string; and
   a fourth detection mechanism that is configured to:
     analyze the overall content of previous email messages that have been detected;
     compare the content of an email message to the overall content and assign a score reflective of a level of similarity for the email message; and
     detect the email message if the score is higher than a designated score.

7. The system of claim 1, wherein the particular undesired email message is, within an email identification list, visually represented using a particular color that is associated with the particular detection mechanism, wherein the particular color is different from another color that is associated with another detection mechanism.

8. The system of claim 1, wherein the particular undesired email message is, within an email identification list, visually represented using a particular lettering style that is associated with the particular detection mechanism, wherein the particular lettering style is different from another lettering style that is associated with another detection mechanism.

9. A system for providing email service, comprising:
means for providing a plurality of detection mechanisms that detect undesired email messages at a user's computing device that receives the email messages from an email server;
means for designating an email message as being undesirable according to a particular detection scheme;
means for marking the email message at the user's computing device with a particular identifier of the particular detection scheme, the means for marking the email message further configured to mark a received email message intended for a child user with a marker indicating that that the email message is addressed to the child user; and
means for displaying a plurality of mail folders associated with a plurality of users that access email messages, the plurality of users comprising at least the child user and the user designated to regulate the child user's access to his or her undesired email messages, the plurality of mail folders comprising at least an inbox folder for the child user and an inbox folder and an undesired mail folder for the user, wherein undesired email messages for the child user are represented as being located in the user's undesired mail folder; and
a display device coupled to the user's computing device, the means for displaying further configured to display the email message at the display device of the user's computing device with the particular identifier in a particular visual manner that is associated with the particular identifier, wherein each of the detection mechanisms is represented using a different visual representation and the user's computing device upon detecting a drag and drop operation to move an email message from the inbox folder of the user to a designated folder of the user where the undesired email messages are stored prompts for the moved email message to be marked as a type of undesired email message that is associated with one of the detection mechanisms, wherein the means for displaying is further configured to detect an embedded child marker and visually represent undesired email messages of the child user in the undesired mail folder of the user in a different manner than undesired email messages of the user in the undesired mail folder of the user.

10. The system of claim 9, wherein the plurality of detection mechanisms includes a means for detecting of an email message from a sender that is not on a list of senders authorized by the user.

11. The system of claim 9, wherein the plurality of detection mechanisms includes a means for detecting an email message from a sender that is on a list of unauthorized senders.

12. The system of claim 9, wherein the plurality of detection mechanisms includes a means for detecting an email message that contains a textual content string that is on a list of unauthorized textual content strings.

13. The system of claim 9, wherein the plurality of detection mechanisms includes a means for detecting an email message that has content that matches a designated level of overall content of previous messages that were determined to be undesirable.

14. The system of claim 9, wherein the plurality of detection mechanisms includes:
means for detecting an email message from a sender that is not on a list of senders authorized by the user;
a means for detecting an email message from a sender that is on a list of unauthorized senders;
a means for detecting an email message that contains a textual content string that is on a list of unauthorized textual content strings; and
means for detecting an email message that has content that matches a designated level of overall content of previous messages that were determined to be undesirable.

15. A method for providing email service, comprising:
displaying a plurality of mail folders associated with a plurality of users that access email messages at a user's computing device, the plurality of users comprising at least a child user and the user designated to regulate the child user's access to his or her undesired email messages, the plurality of mail folders comprising at least an inbox folder for the child user and an inbox folder and undesired mail folder for the user, wherein undesired email messages for the child user are represented as being located in the user's in box folder;
providing a plurality of detection approaches for detecting undesired email messages at the user's computing device that receives the email messages from an email server;
designating an email message as being undesirable according to a particular detection scheme;
marking the undesirable email message at the user's computing device with a particular identifier of the particular detection scheme;
marking a received email message intended for a child user with a marker indicating that that the email message is addressed to the child user;
displaying the undesirable email message at a display device coupled to the user's computing device with the particular identifier in a particular visual manner that is associated with the particular identifier, wherein each of the detection mechanisms is represented using a different visual representation;
displaying the child email message at the user's undesired mail folder on the display device coupled to the computing device in a different visual manner than undesired email messages addressed to the user;
detecting a drag and drop operation to move an email message from the inbox folder of the user to a designated folder where the undesired email messages are stored for the user; and
in response to detecting the drag and drop operation, prompting for the moved email message to be marked as a type of undesired email message that is associated with one of the detection mechanisms.

16. The method of claim 15, wherein the plurality of detection approaches include an approach that detects an email message if the sender of the email message is not on a list of senders authorized by the user.

17. The method of claim 15, wherein the plurality of detection approaches includes an approach that detects an email message if the sender of the email message is on a list of unauthorized senders.

18. The method of claim 15, wherein the plurality of detection approaches include an approach that detects an email message if the email message contains a textual content string that is on a list of unauthorized textual content strings.

19. The method of claim 15, wherein the plurality of detection approaches include an approach that analyzes the overall content of previous email messages that have been detected and detects an email message if the content of the message is similar to the overall content of previous messages.

20. The method of claim 15, wherein the plurality of detection approaches includes:
  an approach that detects an email message if the sender of the email message is not on a list of senders authorized by the user;
  an approach that detects an email message if the sender of the email message is on a list of unauthorized senders;
  an approach that detects an email message if the email message contains a textual content string that is on a list of unauthorized textual content strings; and
  an approach that analyzes the overall content of previous email messages that have been detected and detects an email message if the content of the message is similar to the overall content of the previous messages according to a designated content score.

21. The method of claim 20, wherein the particular visual manner is a particular color that is associated with a first detection approach, wherein the particular color is different from another color that is associated with a second detection approach.

22. The method of claim 20, wherein the particular visual manner is a particular lettering style that is associated with a first detection approach, wherein the particular lettering style is different from another lettering style that is associated with a second detection approach.

23. The method of claim 15, further comprising:
  recognizing which particular detection approach designated the email message as being undesirable upon the visual representation of the email message.

* * * * *